Jan. 17, 1956

O. BORDIGON 2,730,854

ADJUSTABLE TOOTH HARROW

Filed May 9, 1952

INVENTOR.
OTTO BORDIGON,
BY
McMorrow, Berman & Davidson
ATTORNEYS.

Jan. 17, 1956     O. BORDIGON     2,730,854
ADJUSTABLE TOOTH HARROW

Filed May 9, 1952                                                 2 Sheets-Sheet 2

INVENTOR.
OTTO BORDIGON,
BY
McMorrow, Berman & Davidson
ATTORNEYS.

United States Patent Office 2,730,854
Patented Jan. 17, 1956

2,730,854

ADJUSTABLE TOOTH HARROW

Otto Bordigon, Glenn, Calif.

Application May 9, 1952, Serial No. 287,017

2 Claims. (Cl. 55—103)

This invention relates to harrows, and more particularly, has reference to a harrow of the toothed type, adapted particularly for making various types of seed beds and for breaking clods.

One important object of the present invention is to provide a harrow of the character referred to which, in breaking up the soil, will not only break up clods, but will at the same time level out and smooth the ground.

Another important object is to provide a harrow of the type stated provided with a plurality of drag bars each of which carries a longitudinal series of teeth, said drag bars being mounted for adjustment relative to a ground surface in such a way as to adjust the teeth either forwardly or rearwardly of their associated bars, to selected positions of angular adjustment.

Yet another object of importance is to provide a harrow as stated wherein the adjustments referred to can be so made as to permit the teeth alone to engage the ground surface, or to permit, alternatively, the teeth and their associated drag bars to be simultaneously shifted into engagement with the ground surface, in a manner effective to cause coaction between the teeth and drag bars in breaking up clods and pulverizing the soil.

Still another object of importance is to provide a harrow of the type described which is specifically designed in a manner to prevent clogging thereof with the soil, this being a notable deficiency in conventional harrow construction.

Still another object of importance is to provide a tooth harrow which is normally provided with means whereby the harrow may be drawn over the soil along a line disposed transversely of the drag bars thereof, and which will also be provided with means for transporting the harrow from place to place on a set of readily attachable ground wheels, along lines parallel to the drag bars.

Still another object of importance is to provide a harrow as stated that can be readied either for ground conditioning operations or for rollable movement from place to place with maximum speed and ease.

Summarized briefly, the invention includes a pair of spaced frames of the parallelogram type, each of which comprises a pair of vertically spaced, substantially horizontal support bars connected by a plurality of standards spaced longitudinally of and pivotally connected to the support bars. The standards have lower end portions that depend below the support bars, and fixedly secured to said lower end portions are parallel drag bars, that are extended transversely of and between the frames. Each drag bar is provided with a longitudinal series of depending, ground engaging teeth, that are extended in parallelism with the standards, so that adjustment of the standards to angular positions relative to the support bars is effective to correspondingly adjust the teeth relative to the ground surface. The teeth are adjustable, with their associated drag bars, to various positions in one of which the drag bars themselves, and their associated teeth, are in engagement with the ground, and means is provided on the frames for locking the standards in selected positions of adjustment. The structure is so designed as to be adapted to be normally drawn along a line transverse of the drag bars, but is also adapted for mounting thereon of a set of ground wheels used in transporting the structure from place to place, said wheels when mounted on the invention being adapted to permit the rollable movement thereof along lines parallel to the drag bars.

Other objects will appear from the following description, the claims appended thereto, and from the annexed drawing, in which like reference characters designate like parts throughout the several views, and wherein:

Figure 1:
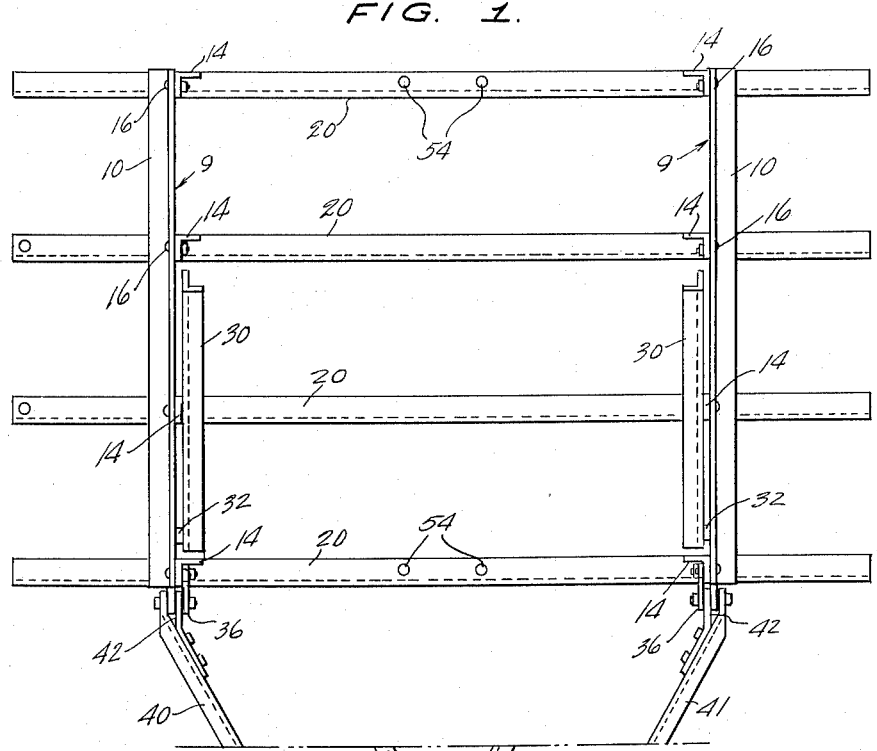
Figure 1 is a top plan view of a harrow formed in accordance with the present invention, portions being broken away.
Figure 2:
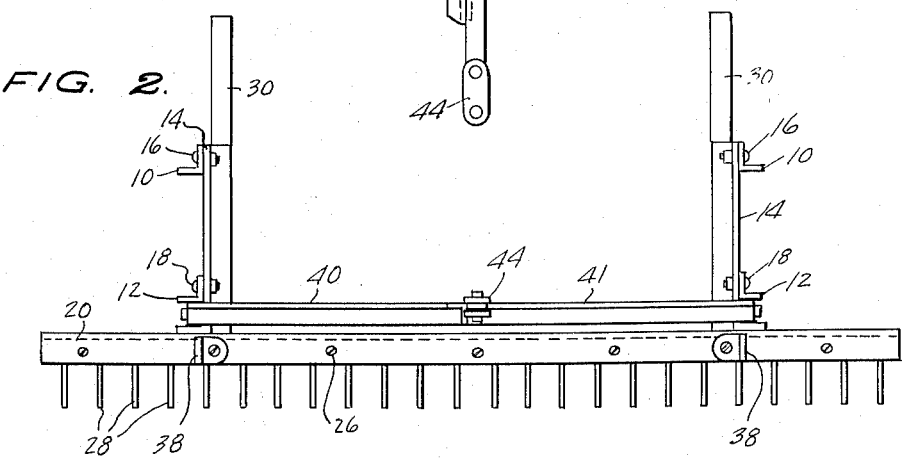
Figure 2 is a front elevational view.

Referring to the drawings in detail, the harrow comprising the present invention includes a pair of open, vertically arranged frames of the parallelogram type, designated generally by the reference numeral 9. The respective frames are disposed in vertical planes, said frames being spaced from one another transversely of the structure and being disposed in parallel relation as shown in Figure 1.

The frames 9 are of identical, though opposite construction, and accordingly, one only will be described.

Each frame 9 includes a horizontal, elongated, upper rail 10 which may be of angle iron material, and which is disposed parallel to and is spaced vertically of a lower rail 12. The rails 10 and 12 constitute support bars for a plurality of standards 14, the standards of each frame being spaced longitudinally of the rails or bars 10 and 12 and extending transversely therebetween.

Each standard is pivotally connected as at 16, at its upper end, to the bar 10, and is also pivotally connected as at 18, intermediate its ends, to the bar 12. The lower end portions of the standards extend downwardly a substantial distance from the lower support bar, and fixedly connected to the bottom end of each of said lower end portions is a drag bar 20 of angle iron material.

As will be noted from Figure 1, the several drag bars 20 are in parallelism, and are extended transversely between the frames 9, the opposite ends of each drag bar projecting beyond the respective frames.

Figure 5:
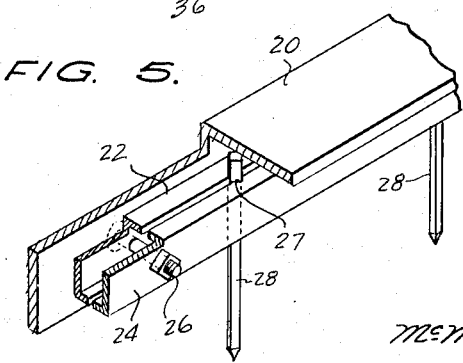
Figure 5 is an enlarged, fragmentary, perspective view of one of the drag bars.

Secured fixedly to the depending leg of each drag bar is a channel 22, receiving an oppositely disposed channel 24. As seen from Figure 5, the respective longitudinal edges of the channels are spaced apart closely from one another. Bolts 26 are extended through the drag bars 20, and the channels 22, 24 for the purpose of securing the channels to one another.

Formed in the respective channels 22, 24 are angular notches 27 spaced longitudinally of said angles, receiving depending teeth 28 of rectangular cross sectional shape. Thus, each drag bar 20 is provided with a longitudinal series of ground engaging teeth, and as will be noted from Figure 3, the teeth 28 are arranged in parallel relation with the standards 14. The teeth 28 are clamped between the channels and have upper end portions extending thereabove. As the teeth wear, they may be adjusted downwardly as desired.

Figure 3:
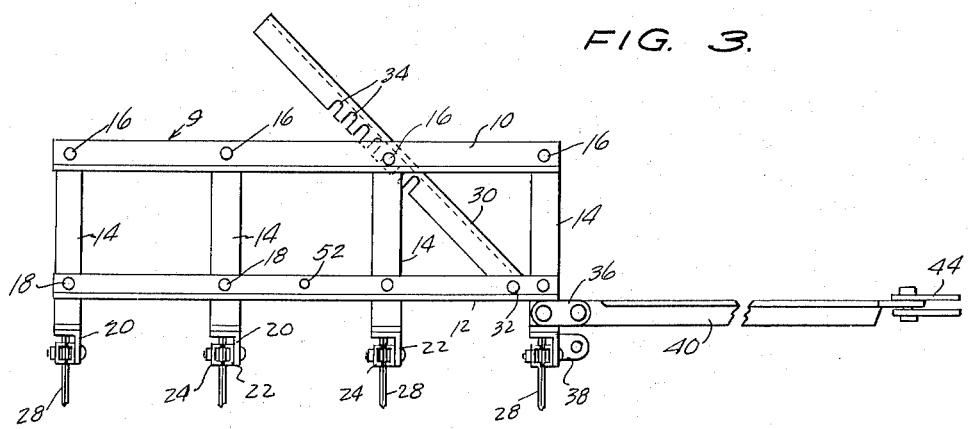
Figure 3 is a side elevational view in which a portion has been broken away.

It will be noted that if the standards 14 are disposed vertically, as in Figure 3, the teeth 28 will also be adjusted to vertical positions. If, however, the standards 14 are shifted to selected positions of angular adjustment relative to the support bars 10 and 12, the teeth 28 will be correspondingly adjusted, and in this connection, it will be apparent that the teeth 28 can be angularly adjusted either forwardly or rearwardly, as desired, this being possible due to the fact that the standards are swingable in either direction.

Means is provided for locking the standards 14 in selected positions of angular adjustment, and to this end, locking bars 30 are provided upon the respective frames 9. The locking bars 30 are pivotally connected as at 32, to the lower support bar 12 of each frame, said locking bars extending at an incline beyond the upper support bar 10 and being provided with a plurality of notches 34, any of which is engageable with one of the pivotal connections 16.

From the above, it is seen that when the support bars 10 and 12 are shifted longitudinally of one another, the standards 14 will be moved into selected positions of angular adjustment, after which the locking bar 30 can be swung downwardly upon its pivotal connection 32 for engagement of a selected notch with one of the pivotal connections 16. This will lock the upper and lower support bars, and their standards, in the selected position of adjustment of the standards.

Pivotally connected to the forwardmost standard 14 of each frame 9 are closely spaced plates 36 (Figure 4), said plates being apertured for detachable connection thereto of forwardly converging tongue members 40, 41. The members 40, 41 extend into meeting relation a substantial distance forwardly of the foremost drag bar 20, and are fixedly connected, the member 41 being extended beyond the fixed connection and being provided with a clevis 44 whereby the structure can be attached to a suitable traction vehicle, not shown.

If desired, the tongue members 40, 41 can be connected to angle brackets 38, fixedly secured to the forwardmost drag bar 20 immediately below the pairs of plates 36. This might be desirable when the teeth 28 have been adjusted to selected angular positions.

To facilitate the connection of the tongue members 40, 41 to the plates 36 or brackets 38, said tongue members are bifurcated as at 42, at their rear ends.

Figure 4:
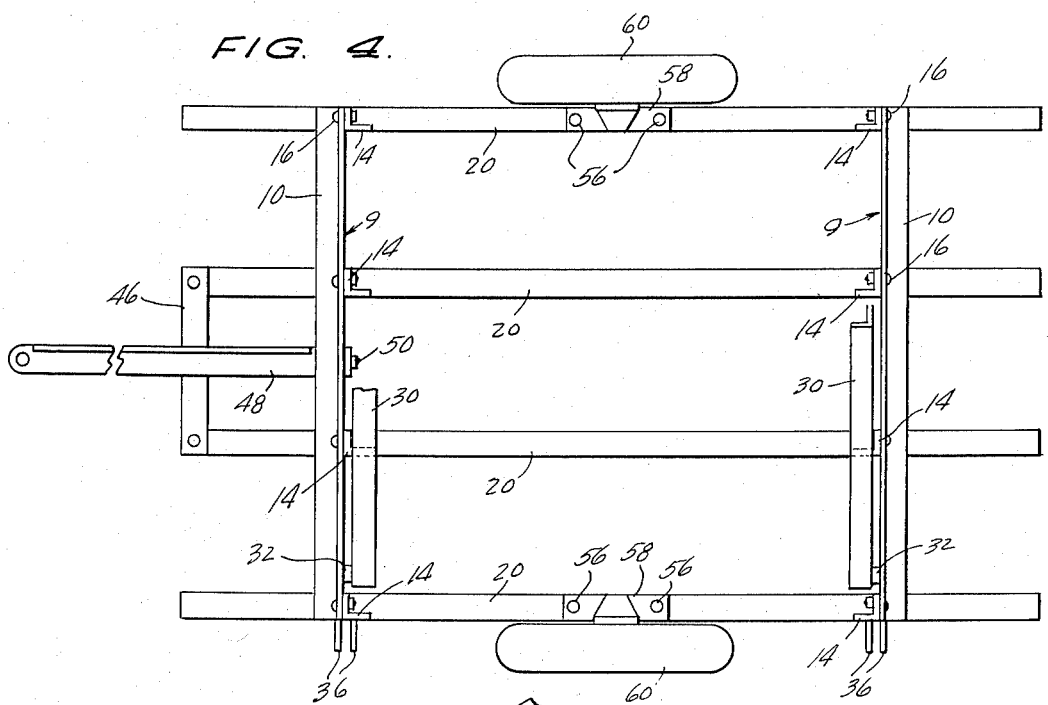
Figure 4 is a top plan view in which the harrow has been readied for transportation between ground conditioning operations.

When it is desired to transport the entire structure without engagement of the teeth 28 with the ground surface, the tongue members 40, 41 are detached or swung upwardly to inoperative positions, and a cross bar 46 is attached to the intermediate drag bars 20, as shown in Figure 4. A draw bar or tongue 48 is then connected by a bolt 50, passed through an opening 52, to the intermediate portion of the adjacent lower support bar 12, and overlies the cross bar 46.

Openings 52 (Figure 1) are formed in the intermediate portions of the foremost and rearmost drag bars 20, receiving bolts 56 whereby mounting plates 58 are connected to the last-named drag bars, said mounting plates being provided with bearings receiving the hubs of wheels 60.

The structure is now ready for rollable movement between ground conditioning operations, and will now roll upon the wheels 60, along lines parallel to the drag bars 20.

It is particularly important to note the action of the teeth 28 and drag bars 20 upon the ground surface. The harrow is especially adapted for making seed beds, and for breaking clods, either on hard or soft ground. When harrowing hard ground, the teeth, which preferably are some six inches apart on each drag bar, are adjusted to positions in which they extend straight up and down, as in Figure 3. If, however, the soil is relatively soft, the teeth 28 are swung to positions in which they are angularly adjusted relative to the ground surface, the teeth being swung in the direction of the rear of the structure. If the ground surface is characterized by a large number of clods that must be broken, the teeth 28 are adjusted rearwardly to even a greater extent, to positions in which they are disposed substantially behind their associated drag bars 20, with only small portions of the pointed ends of the teeth extending below the drag bars. In this position of the parts, the drag bars themselves will engage the clods, and due to their weight, will effectively break the clods. The clods, after being initially broken by the drag bars, will be drawn between the inclined teeth 28, so as to be broken up still further. This has the effect of breaking up and pulverizing the soil in a highly efficient manner, the action of the parts being, at the same time, effective to level the soil to permit the making of seed beds.

It is also believed to be an important characteristic of the invention that the machine can be readied either for ground conditioning operations, or for transport, with a high degree of speed and facility. A minimum number of connections is required for preparing the structure for either operation, since obviously, to prepare the harrow for ground conditioning operations, one need only remove the wheels 60 and tongue 48, and attach the tongue members 40, and 41. When it is desired to move the harrow from place to place, the tongue members are either detached or swung upwardly, and thereafter the wheels 60 are readily attached, by extension of the bolts 56 through the apertures 54.

The harrow constituting the present invention is characterized by its heavy construction. While of course the sizes, and weights of the component parts thereof can be varied to such an extent as is permitted by the scope of the appended claims, the drag bars would, in the preferred embodiment of the invention, be four by four by three-eighths inches in width and thickness. The channels 22, 24 would be two inches in overall width, with a space of two inches being provided between the upper surfaces of the channels and the upper legs of the drag bars to provide for the wear-compensating adjustment of the teeth. The harrow, in a preferred form, would be approximately twelve feet in width and would weigh more than one thousand pounds.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A harrow, comprising: a multiplicity of drag bars connected in spaced parallel relation, the connection of said bars to one another being adapted for joint transverse tilting of the bars, said bars being of inverted L shape in cross section; a pair of facing channel bars carried by each drag bar below and in spaced relation to the upper leg of each bar; clamp means extending through the lower leg of each drag bar and through the channel bars carried thereby, for drawing the channel bars toward one another, said channel bars having facing, angular notches; and teeth engaged in the facing notches of said channel bars of each drag bar, said teeth being adjustable upon their associated drag bar in the direction of the length of the teeth on loosening of the clamp bolts, the upper leg of each drag bar limiting the upper adjustment of the teeth.

2. A harrow comprising a multiplicity of drag bars connected in spaced parallel relation, the connection of said bars to one another being adapted for joint transverse tilting of the bars, a pair of channel bars arranged in face to face spaced relation and carried by each of said drag bars, said channel bars having facing angular notches, teeth engaged in the facing notches of said channel bars of each drag bar and means on each of said drag bars adapted to engage the upper ends of the complemental teeth to limit the upward movement thereof.

References Cited in the file of this patent

UNITED STATES PATENTS

| | | |
|---|---|---|
| 292,955 | Scheaffer | Feb. 5, 1884 |
| 496,440 | Patton | May 2, 1893 |
| 498,295 | Packer | May 30, 1893 |
| 600,661 | Whipple | Mar. 15, 1898 |
| 604,223 | Babcock | May 17, 1898 |
| 998,862 | Anderson | July 25, 1911 |
| 1,019,210 | Wilson | Mar. 5, 1912 |
| 1,113,293 | Bean | Oct. 13, 1914 |
| 1,243,203 | Nelson et al. | Oct. 16, 1917 |
| 1,540,549 | Earhart | June 2, 1925 |
| 1,616,581 | Krotz | Feb. 8, 1927 |